2,549,656

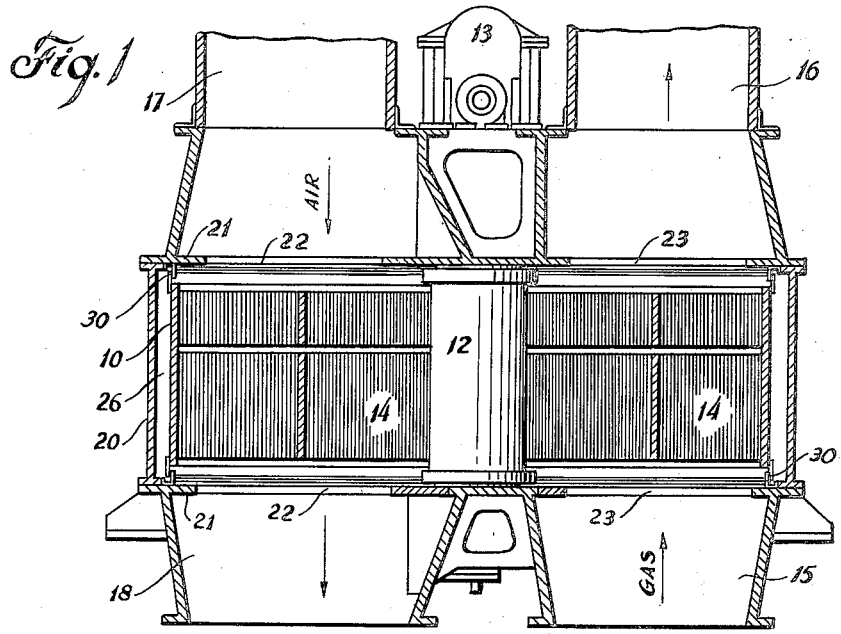
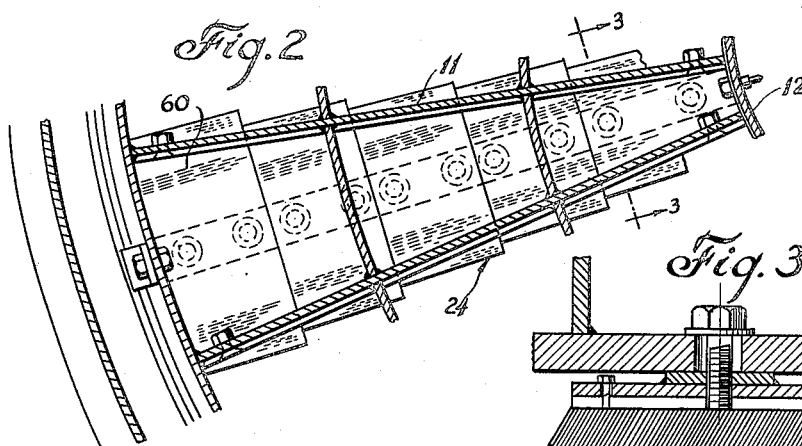
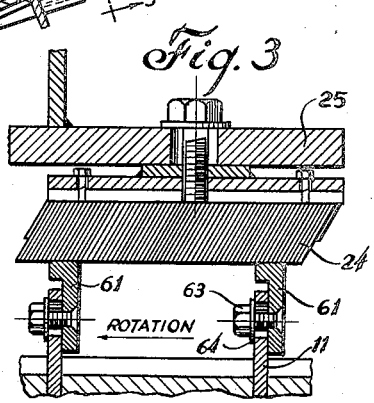
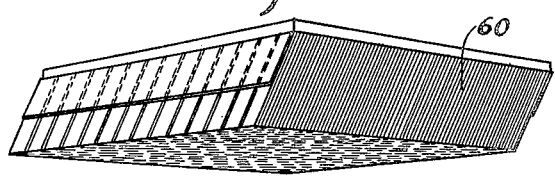
INVENTOR
William D. Yerrick
Sven Holm
BY
ATTORNEY Patented Apr. 17, 1951

UNITED STATES PATENT OFFICE 2,549,656

RADIAL BRUSH SEAL FOR HEAT EXCHANGERS

William D. Yerrick and Sven Holm, Wellsville, N. Y., assignors to The Air Preheater Corporation, New York, N. Y.

Original application October 10, 1947, Serial No. 779,044. Divided and this application January 15, 1949, Serial No. 71,144

3 Claims. (Cl. 257—6)

The present invention relates to improved radial seals for use between the rotor and enclosing housing of a rotary regenerative air preheater or similar apparatus.

In a rotary regenerative heater of the Ljungstrom type a cylindrical rotor has compartments carrying metallic heat transfer plates which as the rotor turns are first exposed to heating gases and then disposed in the air passage to impart the absorbed heat to the air. The rotor is surrounded by a housing having end or sector plates formed with openings to provide for the flow of gas and air. To prevent the mingling of the two fluids the partitions forming the rotor compartments are provided with radial seals that wipe against the imperforate portions of the sector plates or vice versa. In order to preclude by-passing of gas and air around the rotor through the clearance space between the sides of the rotor and the housing without passing over the heat transfer material, it is also customary to provide the rotor with circumferential seals that bear against the sector plates or other stationary parts of the housing.

The present invention contemplates constructing the radial seals from brushes whose bristles are made of metal or other suitable material and will be best understood upon consideration of the following detailed description of an illustrative embodiment thereof when read in conjunction with the accompanying drawings in which:

Figure 1 is a sectional elevational view in diagrammatic form of a rotary regenerative air preheater embodying the present invention.

Figure 2 is an elevational view on an enlarged scale as seen on the line 2—2 of Figure 3 illustrating one of the brush type radial seals in cooperative relation with the partitions that form the rotor compartments carrying heat transfer plates.

Figure 3 is a view on an enlarged scale as viewed on line 3—3 in Figure 2 of part of the rotor embracing one complete compartment and parts of adjacent compartments on either side thereof and shows the relation of the radial seals to the partitions.

Figure 4 is a perspective view of one of the brush elements which make up the radial seals.

In the drawings the numeral 10 designates the cylindrical shell of a rotor divided into sector shaped compartments by radial partitions 11 connecting it with the rotor post 12 which is driven by a motor and reduction gearing 13 to turn the rotor slowly about its axis. The rotor compartments contain regenerative heat transfer material in the form of closely spaced metallic plates 14 which first absorb heat from hot gases entering the preheater through a duct 15 from a boiler or other source to be discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through duct 18.

A housing 20 enclosing the rotor 10 is provided at either end opposite the latter with end or sector plates 21 which are apertured at 22 and 23 to admit and discharge streams of gas and air flowing through the preheater. In order that the streams of gas and air may not commingle, a portion of the rotor at least equal to but usually greater in circumferential extent than one rotor compartment must be isolated or blocked off between the gas and air passages. As illustrated, radial seals designated as a whole by the numeral 24 (Figs. 2 and 3) are provided in cooperative relation between the radial partitions 11 and the sector plates 21 whose imperforate portions 25 must be at least slightly greater than the width of the compartments in the rotor. In order that the streams of gas and air may not by-pass the heat transfer surface 14 by flowing in the annular clearance space 26 between the rotor shell 10 and the housing 20 it is customary to provide circumferential seals indicated diagrammatically at 30 on the shell 10 which wipe against the sector plates 21 or allied parts so as to seal off the space 26 at both ends of the rotor.

In accordance with the present invention the radial seals 24 are essentially brushes with bristles 31 of some suitable heat resisting alloy. The radial seals 24 are in the form of blocks or pads of wire brush made up of a plurality of sections 60 one of which is shown in perspective view in Fig. 4. These are mounted on the imperforate portions 25 of the sector plates 21 so as to face the rotor. Mounted on the end edges of the radial partition plates 11 are wear shoes 61 of cast iron or heat resisting alloy against which the brushes 60 contact. The radial brush seal 24 made up of a number of pads 60 radially aligned has a circumferential width slightly greater than that of a rotor compartment so that at least one wear shoe 61 is always in contact with the seal 24 to prevent cross flow of the streams of gas and air over the ends of the rotor. The wear shoes 61 are mounted on the ends of partitions 11 by bolts 63 passing through elongated holes 64 to provide for vertical adjustment to compensate for the wear of brushes 60. The side edges of the brush sections 60 may be parallel as illustrated in Fig. 4 so that the radial seal may be made up of a number of similar sections, whereas, if the sides were radial the component sections of the radial seal located between the rotor post and shell would be of similar shape but different in size because of the divergence caused by the radial construction.

The radial seals described offer no obstruction on the ends of the partitions to flow of fluids. The wear shoes 61 on the diaphragms 11 have structural strength and cannot be damaged by being walked on when an operative is replacing heat transfer plates or standing on the top of the rotor to do other work. The sealing brushes 60 being mounted on the inner faces of the sector plates 21 are concealed thereby and thus protected from damage. As described above the bristles form a multi-labyrinth seal with very high resistance against flow of gas or air and therefore prevent leakage at relatively high pressure differentials.

The subject matter of this application is divided from that filed in our name on October 10, 1947, under Serial No. 779,044.

What we claim is:

1. In a regenerative air preheater or the like having a rotor made up of a cylindrical shell joined to a rotor post by radial partitions forming compartments that carry heat transfer material, and a housing surrounding the rotor and provided opposite the ends of the latter with sector plates extending transversely across the rotor and formed with apertures for the flow of heating gases and air to and through the rotor; brush sealing means mounted on the inner surfaces of the imperforate portions of said sector plates between the openings therein so as to face the rotor and being of an extent circumferentially of the rotor to be in simultaneous contact with the entire radial extent of the end edges of two contiguous partitions during turning of the rotor.

2. In a regenerative air preheater or the like having a rotor made up of a cylindrical shell joined to a rotor post by radial partitions forming compartments that carry heat transfer material, and a housing surrounding the rotor and provided opposite the ends of the latter with sector plates formed with apertures for the flow of heating gases and air to and through the rotor; brush sealing means mounted on the inner surfaces of the imperforate portions of said sector plates between the openings therein so as to face the rotor; and wear shoes mounted on the end edges of said rotor partitions so as to wipe against said brush means as the rotor turns.

3. Radial sealing means as defined in claim 2 wherein the wear shoes are adjustably mounted.

WILLIAM D. YERRICK.
SVEN HOLM.

REFERENCES CITED

The following references are of record in the file of this patent:

UNITED STATES PATENTS

| Number | Name | Date |
|---|---|---|
| 1,746,598 | Ljungstrom | Feb. 11, 1930 |
| 2,287,777 | Boestad | June 30, 1942 |
| 2,334,663 | Whitney | Nov. 16, 1943 |